United States Patent
Richard

[19]

[11] Patent Number: 6,142,086
[45] Date of Patent: Nov. 7, 2000

[54] AIR SEEDER SINGULATION SYSTEM

[76] Inventor: Leroy J. Richard, 734-13th Ave. East, West Fargo, N. Dak. 58078

[21] Appl. No.: 09/188,808

[22] Filed: Nov. 9, 1998

[51] Int. Cl.$^7$ .................................................... A01C 15/04
[52] U.S. Cl. .............................................. 111/174; 111/77
[58] Field of Search ................................ 111/77, 78, 174, 111/175, 177, 185; 221/211, 266, 278; 406/41, 142, 143, 146, 194, 196, 197

[56] References Cited

U.S. PATENT DOCUMENTS

| | | | |
|---|---|---|---|
| 3,156,201 | 11/1964 | Tweedale | 111/77 |
| 3,951,306 | 4/1976 | Ernst | 111/77 X |
| 4,741,428 | 5/1988 | Taniguchi et al. | 221/211 X |
| 5,082,126 | 1/1992 | Ribouleau | 221/211 |
| 5,501,366 | 3/1996 | Fiorido | 221/211 |
| 5,535,917 | 7/1996 | Ribouleau | 221/211 |
| 5,915,312 | 6/1999 | Meyer et al. | 111/174 |

Primary Examiner—Robert E. Pezzuto
Attorney, Agent, or Firm—Michael S. Neustel

[57] ABSTRACT

An air seeder singulation system for evenly dispensing seed amongst a plurality of rows. The inventive device includes a vacuum drum rotably mounted within a pressurized housing, a supply tube is connected to the housing and to a manifold to provide pressurized and seed to the housing, a vacuum seed connected to the vacuum drum along the vacuum drum's rotational axis whereby the vacuum tube is connected to a vacuum source, a vacuum channel within an outer periphery of the vacuum drum, a band member containing a plurality of apertures at a specified distance apart, and a seed tube extending into the housing with an engaging end near the band member for plucking the seeds attached to the band member. The seeds are then dispensed through the seed tube into a furrow created by a conventional disk opener. A plurality of the inventions are to be aligned with one another with the respective vacuum tubes interconnected. In an alternative embodiments, there is a single housing rotatably containing the plurality of vacuum drums.

20 Claims, 2 Drawing Sheets

AIR SEEDER SINGULATION SYSTEM

BACKGROUND OF THE INVENTION

1. Field of the Invention

The present invention relates generally to air seeders and more specifically it relates to an air seeder singulation system for evenly dispensing seed amongst a plurality of rows during planting.

2. Description of the Prior Art

Air seeders have been in use for years. Typically, the seed is stored within a seed tube and a specified rate of seed is allowed to enter a tube where after pressurized air forces the seed through the tube into a manifold. The manifold typically has a plurality of seed tubes extending from an upper portion of the manifold that receive the seed from the manifold. The seeds are then projected through seed tubes and then emitted behind a disk opener into a furrow for planting.

Conventional air seeders do not provide an even distribution of seed for several reasons. First, because the seed tubes have differing lengths extending from the manifold, the seeds have differing amounts of travel and time to exit the seed tube into the furrow. This is especially noticeably when initially seeding because there is no seed initially within the seed tubes. Second, the random distribution of the seeds in the manifold into the seed tubes is never exact hence leading to some rows with more seed density than others. Third, conventional air seeders must be operating prior to movement of the tractor during the initial seeding to avoid skipping which can lead to wasted seed every time the conventional air seeder is started and stopped. Hence, there is a need for an air seeder that provides an even distribution of seeds within all rows of the planter.

Examples of air seeding devices include U.S. Pat. No. 3,156,201 to Tweedale; U.S. Pat. No. 3,698,332 to McCallum; U.S. Pat. No. 4,306,509 to Hassan et al; U.S. Pat. No. 4,268,841 to Powilleit; U.S. Pat. No. 5,740,746 to Ledermann et al which are all illustrative of such prior art.

Tweedale (U.S. Pat. No. 3,156,201) discloses a vacuum-type seed planter comprising a seed tank, a suction drum rotatably mounted on the planter, and a plurality of periphery in the suction drum so that the seeds are drawn against the drum openings and are carried over the apertures from the seed tank to the hollow centered drill.

McCallum (U.S. Pat. No. 3,698,332) discloses a positive pressure feed wheel for a planter having a plurality of radial fingers having a passage therethrough terminating in a seed pick-up port.

Hassan et al (U.S. Pat. No. 4,306,509) discloses a vacuum drum planter for continuously metering seeds onto a seedbed and simultaneously pressing the seeds into the soil. Hassan et al teaches a drum adapted to be moved in rolling contact across the seedbed and which transports seeds on its peripheral wall from a hopper to the seed bed.

While these devices may be suitable for the particular purpose to which they address, they are not as suitable for evenly dispensing seed amongst a plurality of rows. Conventional air seeders do not provide an even distribution of seed amongst the seed rows which is desirable when planting.

In these respects, the air seeder singulation system according to the present invention substantially de;arts from the conventional concepts and designs of the prior art, and in so doing provides an apparatus primarily developed for the purpose of evenly dispensing seed amongst a plurality of rows.

SUMMARY OF THE INVENTION

In view of the foregoing disadvantages inherent in the known types of air seeders now present in the prior art, the present invention provides a new air seeder singulation system construction wherein the same can be utilized for evenly dispensing seed amongst a plurality of rows.

The general purpose of the present invention, which will be described subsequently in greater detail, is to provide a new air seeder singulation system that has many of the advantages of the air seeders mentioned heretofore and many novel features that result in a new air seeder singulation system which is not anticipated, rendered obvious, suggested, or even implied by any of the prior art air seeders, either alone or in any combination thereof.

To attain this, the present invention generally comprises a vacuum drum rotatably mounted within a pressurized housing, a supply tube is connected to the housing aid to a manifold to provide pressurized air and seed to the housing, a vacuum tube connected to the vacuum drum along the vacuum drum's rotational axis whereby the vacuum tube is connected to a vacuum source, a vacuum channel within an outer periphery or the vacuum drum, a band member containing a plurality of apertures at a specified distance apart, and a seed tube extending into the housing with an engaging end near the band member for plucking the seeds attached to the band member. The seeds are then dispensed through the seed tube into a furrow created by a conventional disk opener. A plurality of the inventions are to be aligned with one another with the respective vacuum tubes interconnected. In an alternative embodiment, there is a single housing rotatably containing the plurality of vacuum drums.

There has been outlined, rather broadly, the more important features of the invention in other that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practices and carried out in various ways. Also, it is to be of the description and should not be regarded as limiting.

A primary object of the present invention is to provide an air seeder singulation system that will overcome the shortcomings of the prior art devices.

Another object is to provide an air seeder singulation system that evenly distributes seed amongst all of the rows.

An additional object is to provide an air seeder singulation system that reduces skips associated with initial planting.

A further object is to provide an air seeder singulation system that reduces seed wastage.

Another object is to provide an air seeder singulation system that allows movement of the implement immediately upon startup of the air seeder.

Other object and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and the changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
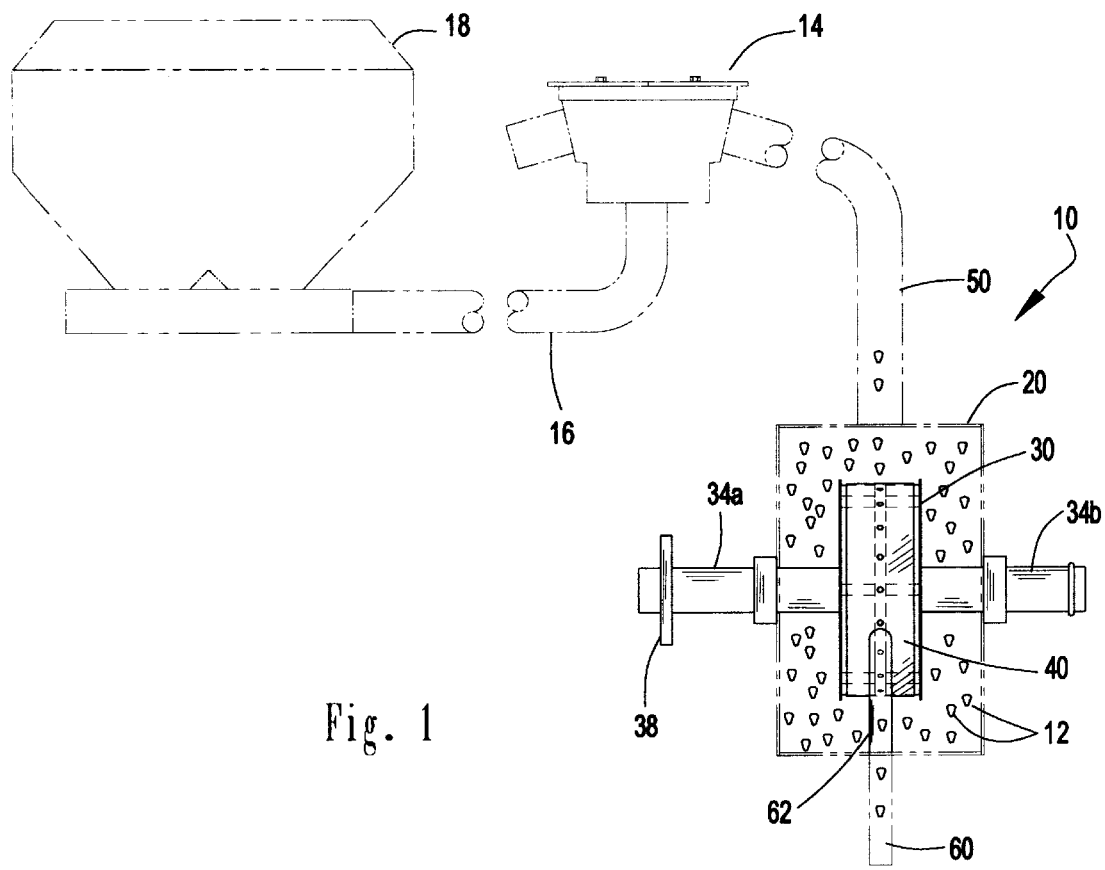
FIG. 1 is a front view of the present invention showing the interconnections between the seed tank, manifold and the present invention.

Turning now descriptively to the drawings, in which similar reference characters denote similar elements throughout the several view,FIGS. 1 through 4 illustrate an air seeder singulation system 10, which comprises a vacuum drum 30 rotatably mounted within a pressurized housing 20, a supply tube 50 is connected to the housing 20 and to a manifold 14 to provide pressurized air and seed 12 to the housing 20, a vacuum tube connected to the vacuum drum 30 along the vacuum drum's 30 rotational axis whereby the vacuum tube 34a is connected to a conventional vacuum source, a vacuum channel 32 within an outer periphery of the vacuum drum 30, a band member 40 containing a plurality of apertures 42 at a specified distance apart, and a seed tube 60 extending into the housing 20 with an engaging end 62 near the band member 40 for plucking the seeds 12 attached to the band member 40. The seeds 12 are then dispensed through the seed tube 60 into a furrow created by a conventional disk opener. A plurality of the inventions are are to be aligned with one another with the respective vacuum tubes 34a–b interconnected. In an alternative embodiment, there is a single housing 20 rotatably containing the plurality of vacuum drums 30.

As shown in FIG. 1 of the drawings, a seed tank 18 stores a plurality of seeds 12 to be planted. The seed tank 18 is connected to a manifold 14 by a connecting tube 16 as further shown in FIG. 1 as is well known in the art. A plurality of supply tubes 50 extend from an upper portion of the manifold 14 and are connected at the opposite ends thereof to an individual housing 20.

Figure 3:
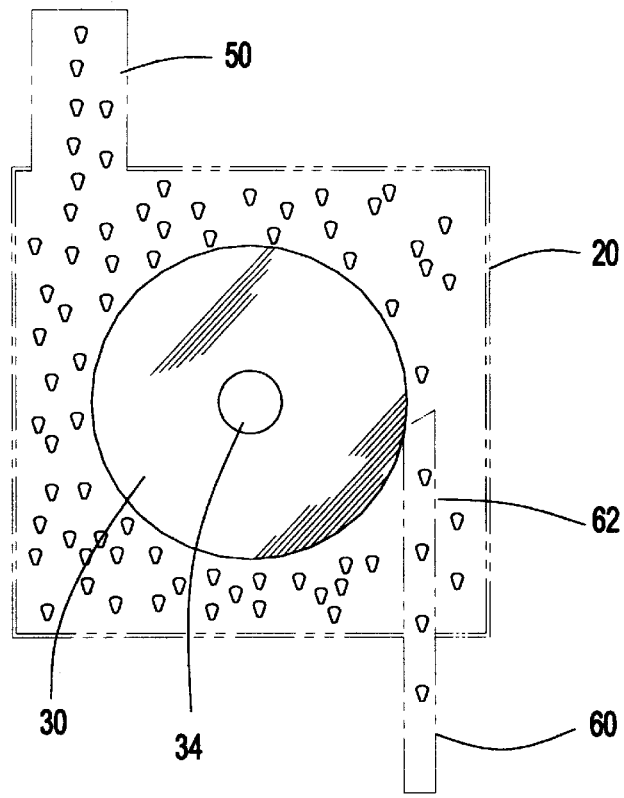
FIG. 3 is a side view of the vacuum drum rotatably mounted within a pressurized housing.

As shown in FIGS. 1 and 3 of the drawings, the housing 20 has a sufficient interior portion for allowing the accumulation of seed 12. The housing 20 is preferably completely sealed to maintain a desired air pressure within the housing 20 during use. The housing 20 may be constructed of any conventional material and may be comprised of any well-known shape.

As shown in FIGS. 1 and 3 of the drawings, a vacuum drum 30 is rotatably supported within the housing 20. A pair of vacuum tubes 34a–b extends from opposing sides of the vacuum drum 30 and extends through the side walls of the housing 20. The right vacuum tube 34b is in fluidly connectable to an adjacent left vacuum tube 34a connected to an adjacent vacuum drum 30. A conventional vacuum source is connected to the left vacuum tube 34a to provide a constant vacuum throughout all of the vacuum tubes 34a–b and vacuum drums 30. A drive sprocket 38 may be attached to one of the vacuum tubes 34a–b and mechanically connected to a rotation means for rotating the vacuum tubes 34a–b and vacuum drums 30.

Figure 2:
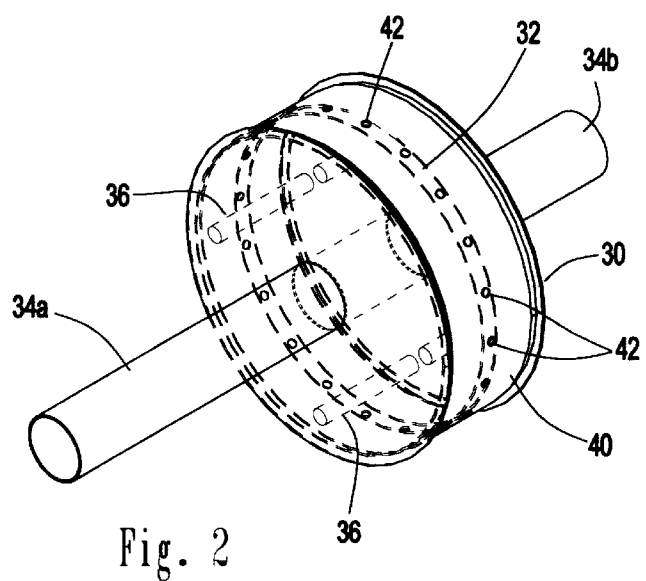
FIG. 2 is an upper perspective view of the drum and band member containing the plurality of apertures for capturing individual seeds.

The vacuum drum 30 has a vacuum channel 32 along a central outer periphery portion that is connected to the interior portion of the vacuum drum 30. The vacuum channel 32 may be formed by using a U-shaped or V-shaped channel with at least one opening into the interior portion of the vacuum drum 30. As shown in FIGS. 1 and 2, the vacuum channel 32 may be formed by a slot along the central outer periphery with a plurality of support members 36 supporting the opposing portions of the vacuum drum 30. The vacuum drum 30 also preferably has an unnumbered pair of outer radial flanges as best shown in FIGS. 1 and 2 for retaining a band member 40.

As shown in FIGS. 1 and 2, the band member 40 is removably positionable upon the band member 40 to sealably enclose the vacuum channel 32. The band member 40 includes a plurality of distally spaced apertures 42 sized for the appropriate size of seed 12. The apertures 42 collect the seeds 12 deposited into the housing 20 by the supply tube and are evenly spaced to provide a near perfect distribution of the seeds 12 in the furrow during planting. The band member 40 is preferably comprised of a resilient material, such as rubber, however it can be appreciated that other well-known materials may be utilized to comprise the band member 40.

A seed tube 60 extends through a lower portion of the housing 20 with an engaging end 62 adjacent a potion of the band member 40. The engaging end 62 is preferably slanted downwardly toward the vacuum drum 30 and band member 40. The engaging end 62 "plucks" the seeds 12 attached to the apertures 42 by the vacuum within the vacuum drum 30 by engaging a portion of the seed 12 and removing it from the vacuum. The seed 12 is then transported and forced through the seed tube 60 into a convention disk opener and packer wheel system for planting within the furrow.

Figure 4:
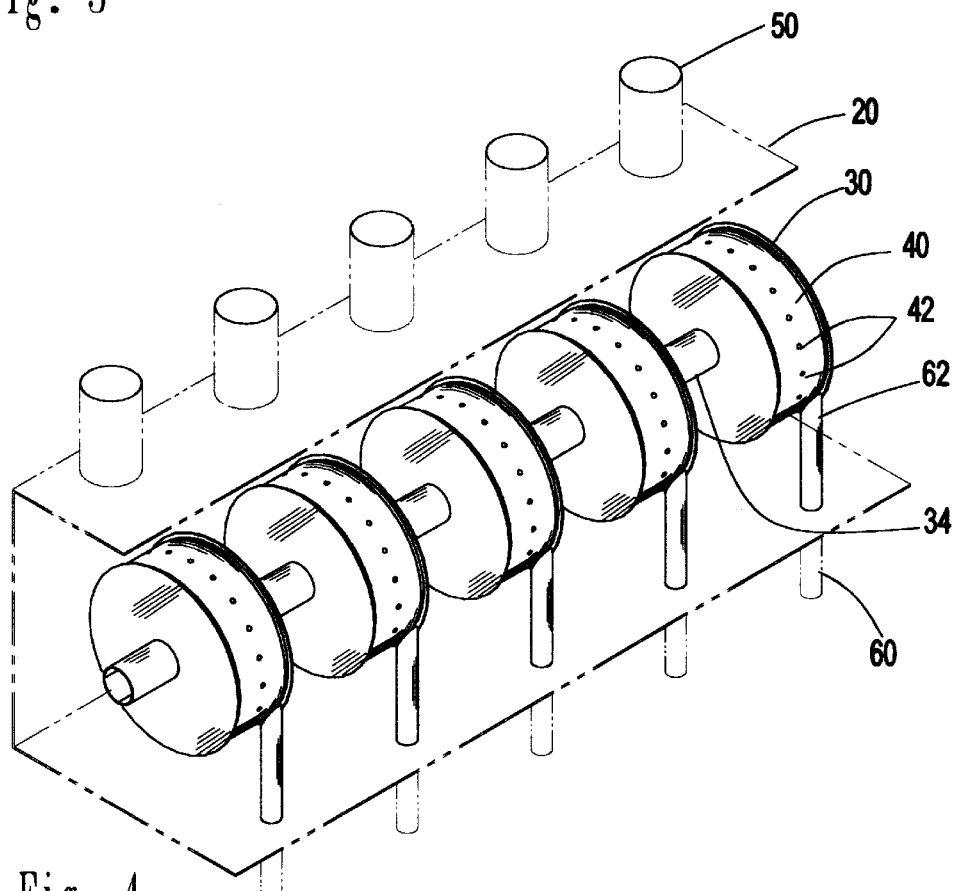
FIG. 4 is an upper perspective view of an alternative embodiment with a single housing utilized to surround a plurality of vacuum drums.

In an alternative embodiment shown in FIG. 4, a single housing 20 encloses a plurality of vacuum drums 30 and seed tubes 60. This reduces the number of seals required because of the vacuum tubes 34a–b and amount of space taken by the invention.

In use, the user selects the proper band members 40 depending upon the desired spacing of the seeds 12 and the size of the seeds 12. If the seed 12 is relatively large in size, a band member 40 with a relatively large set of apertures 42 is preferred. The spacing between the apertures 42 also determines the spacing of the individual seeds 12 during planting. The user places the selected band members 40 about the vacuum drums 30 so as to align the apertures 42 with the vacuum channel 32. The user then seals the housing 20 surrounding each of the vacuum drums 30 and then engages the vacuum means that is connected to the vacuum tubes 34a–b. The vacuum means creates a vacuum within the vacuum drums 30 for drawing the seeds 12 onto the apertures 42 of the band member 40. The user then operates the air seeder with a pressure means attached thereto, thereby forcing the seed 12 from the seed tank 18 through the connecting tube 16 into the manifold 14. The seeds 12 then flow from the manifold 14 into the housings 20 where some are instantly attracted to the band member 40 and others are stored within the housing 20. The rotation means is then engaged thereby rotating the vacuum drums 30 with the seeds 12 attracted to the band member 40 upon the vacuum drum 30. The user then drives the tractor so as to pull the planter through the field simultaneously. The air pressure within the housing 20 created by the pressure means helps retain the seeds 12 onto the band member 40 during rough terrain. The seeds 12 attached to the apertures 42 upon the band member 40 are then deposited into their respective seed tube 60 as shown in FIG. 3 of the drawings where after they are forced through the seed tube 60 by the air pressure into the furrow created by a conventional disk opener.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air seeder singulation system having a plurality of units, each unit comprising:

a housing having an interior chamber;

a supply tube connected to said housing for supplying seed into said housing;

a vacuum drum rotatably mounted within said interior chamber of said housing;

a vacuum channel within an outer periphery of said vacuum drum;

a removable band member having a plurality of distally spaced apertures positionable about said vacuum drum for said vacuum channel;

a seed dispensing means for removing seeds attached to said band member and dispensing into a conventional disk opener system;

a drive means connected to said vacuum drum for rotating said vacuum drum; and a vacuum means connected to vacuum drum for creating a vacuum within said vacuum drum.

2. The air seeder singulation system of claim 1, including a pressure means connected to said supply tube for pressurizing said interior chamber of said housing.

3. The air seeder singulation system of claim 1, wherein said seed dispensing means comprises a seed tube having an engaging end adjacent said band member.

4. The air seeder singulation system of claim 1, wherein said band member is comprised of a resilient and flexible material.

5. The air seeder singulation system of claim 1, wherein said vacuum channel is comprised of a V-shaped channel.

6. The air seeder singulation system of claim 1, wherein said vacuum channel is comprised of a U-shaped channel.

7. The air seeder singulation system of claim 1, wherein said vacuum channel is comprised of a slot through said outer periphery of said vacuum drum and including a plurality of support members extending within said vacuum drum.

8. The air seeder singulation system of claim 1, wherein said plurality of units are interconnected by a corresponding plurality of vacuum tubes that are connected to said vacuum drum along a rotational axis.

9. The air seeder singulation system of claim 1, wherein said band member is comprised of rubber.

10. The air seeder singulation system of claim 1, wherein said apertures are sized to capture an appropriate size of seed.

11. An air seeder singulation system, comprising:

a housing having an interior chamber;

at least one supply tube connected to said housing for supplying seed into said housing;

a plurality of vacuum drums rotatably mounted within said interior chamber of said housing;

a vacuum channel within an outer periphery each said vacuum drum;

a removable band member having a plurality of distally spaced apertures positionable about said vacuum drum for said vacuum channel;

a seed dispensing means for removing seeds attached to said band member and dispensing into a conventional disk opener system;

a drive means connected to said plurality of vacuum drums for rotating said plurality of vacuum drum; and a vacuum means connected to said plurality of vacuum drums for creating a vacuum within each said vacuum drum.

12. The air seeder singulation system of claim 11, including a pressure means connected to said at least one supply tube for pressurizing said interior chamber of said housing.

13. The air seeder singulation system of claim 11, wherein said seed dispensing means comprises a seed tube having an engaging end adjacent each said band member.

14. The air seeder singulation system of claim 11, wherein said band member is comprised of a resilient and flexible material.

15. The air seeder singulation system of claim 11, wherein said vacuum channel is comprised of a V-shaped channel.

16. The air seeder singulation system of claim 11, wherein said vacuum channel is comprised of a U-shaped channel.

17. The air seeder singulation system of claim 11, wherein said vacuum channel is comprised of a slot through said outer periphery of said vacuum drum and including a plurality of each support members extending within each said vacuum drum.

18. The air seeder singulation system of claim 11, wherein said plurality of units are interconnected by a corresponding plurality of vacuum tubes that are connected to said vacuum drum along a rotational axis.

19. The air seeder singulation system of claim 11, wherein each said band member is comprised of rubber.

20. The air seeder singulation system of claim 19, wherein said apertures are sized to capture an appropriate size of seed.

* * * * *